US011254846B2

(12) United States Patent
Oh et al.

(10) Patent No.: US 11,254,846 B2
(45) Date of Patent: Feb. 22, 2022

(54) TWO PART ADHESIVE COMPOSITION

(71) Applicant: LG Chem, Ltd., Seoul (KR)

(72) Inventors: Wan Kyu Oh, Daejeon (KR); Gyeong Shin Choi, Daejeon (KR); Seung Young Park, Daejeon (KR)

(73) Assignee: LG Chem, Ltd.

( * ) Notice: Subject to any disclaimer, the term of this patent is extended or adjusted under 35 U.S.C. 154(b) by 400 days.

(21) Appl. No.: 16/344,138

(22) PCT Filed: May 2, 2018

(86) PCT No.: PCT/KR2018/005103
§ 371 (c)(1),
(2) Date: Apr. 23, 2019

(87) PCT Pub. No.: WO2018/203667
PCT Pub. Date: Nov. 8, 2018

(65) Prior Publication Data
US 2019/0322912 A1 Oct. 24, 2019

(30) Foreign Application Priority Data
May 2, 2017 (KR) .................. 10-2017-0056390

(51) Int. Cl.
| C09J 133/06 | (2006.01) |
| C08K 3/04 | (2006.01) |
| C08K 3/34 | (2006.01) |
| C08K 3/36 | (2006.01) |
| C08K 5/14 | (2006.01) |
| C08L 9/02 | (2006.01) |
| C08L 9/06 | (2006.01) |
| C08L 15/00 | (2006.01) |
| C08L 25/06 | (2006.01) |
| C08L 25/12 | (2006.01) |
| C08L 55/02 | (2006.01) |
| C08L 63/04 | (2006.01) |
| C09J 11/06 | (2006.01) |
| C09J 133/10 | (2006.01) |

(52) U.S. Cl.
CPC .......... C09J 133/066 (2013.01); C08K 3/041 (2017.05); C08K 3/346 (2013.01); C08K 3/36 (2013.01); C08K 5/14 (2013.01); C08L 9/02 (2013.01); C08L 9/06 (2013.01); C08L 15/00 (2013.01); C08L 25/06 (2013.01); C08L 25/12 (2013.01); C08L 55/02 (2013.01); C08L 63/04 (2013.01); C09J 11/06 (2013.01); C09J 133/10 (2013.01); *C08L 2205/03* (2013.01)

(58) Field of Classification Search
CPC .................................................. C09J 133/066
See application file for complete search history.

(56) References Cited

U.S. PATENT DOCUMENTS

| 4,223,115 A | 9/1980 | Zalucha et al. |
| 4,452,944 A | 6/1984 | Dawdy |
| 4,857,131 A | 8/1989 | Damico et al. |
| 6,291,593 B1 | 9/2001 | Cheng |
| 6,433,091 B1 | 8/2002 | Cheng |
| 6,776,869 B1 | 8/2004 | Schenkel |
| 6,884,854 B2 | 4/2005 | Schoenfeld et al. |
| 8,362,120 B2 | 1/2013 | Huang et al. |
| 2002/0007027 A1 | 1/2002 | Wang et al. |
| 2004/0010099 A1 | 1/2004 | Kneafsey et al. |
| 2004/0229990 A1 | 11/2004 | Righettini et al. |
| 2005/0107757 A1 | 5/2005 | Burton et al. |
| 2006/0122319 A1 | 6/2006 | Kneafsey et al. |
| 2006/0252866 A1 | 11/2006 | Wang et al. |
| 2007/0093600 A1 | 4/2007 | De Cooman et al. |
| 2008/0132613 A1 | 6/2008 | Wang et al. |
| 2008/0202683 A1 | 8/2008 | Tsuno et al. |
| 2010/0084091 A1 | 4/2010 | Levandoski et al. |
| 2010/0116435 A1 | 5/2010 | Curet et al. |
| 2011/0083804 A1 | 4/2011 | Curet |
| 2012/0145312 A1 | 6/2012 | Pressley |
| 2013/0056153 A1 | 3/2013 | Czaplicki |
| 2014/0199549 A1 | 7/2014 | Shin |
| 2014/0235758 A1* | 8/2014 | Cheng .................. C09J 133/10 523/438 |
| 2014/0235793 A1 | 8/2014 | Wang et al. |
| 2015/0038630 A1 | 2/2015 | Kropp et al. |
| 2015/0225626 A1 | 8/2015 | Murray et al. |
| 2015/0267092 A1 | 9/2015 | Hill et al. |
| 2015/0299537 A1 | 10/2015 | Czaplicki |
| 2015/0376473 A1 | 12/2015 | Khongal et al. |
| 2016/0002507 A1 | 1/2016 | Houlihan et al. |
| 2016/0152819 A1* | 6/2016 | Balijepalli .............. C08L 63/00 523/456 |
| 2016/0194530 A1* | 7/2016 | Halterman ............. C09J 125/12 524/437 |
| 2017/0137713 A1 | 5/2017 | Wittek et al. |

FOREIGN PATENT DOCUMENTS

| CN | 103958628 A | 7/2014 |
| CN | 104781358 A | 7/2015 |

(Continued)

OTHER PUBLICATIONS

Search Report from First Chinese Office Action for Application No. 201880009085.6 dated Dec. 31, 2020; 3 pages.

(Continued)

*Primary Examiner* — Daniel H Lee
(74) *Attorney, Agent, or Firm* — Lerner, David, Littenberg, Krumholz & Mentlik, LLP

(57) ABSTRACT

The present disclosure relates to an acrylic adhesive composition exhibiting excellent lap shear strength and adhesive strength by including an adhesion enhancer of a specific component.

19 Claims, No Drawings

(56) References Cited

FOREIGN PATENT DOCUMENTS

| | | | |
|---|---|---|---|
| CN | 105452315 | A | 3/2016 |
| CN | 106459763 | A | 2/2017 |
| EP | 0086469 | A1 | 8/1983 |
| EP | 0270318 | A2 | 6/1988 |
| EP | 0278642 | A2 | 8/1988 |
| EP | 0357304 | A2 | 3/1990 |
| EP | 1086185 | A1 | 3/2001 |
| EP | 1187888 | A1 | 3/2002 |
| EP | 1155082 | B1 | 9/2004 |
| KR | 20000063981 | A | 11/2000 |
| KR | 100328236 | B1 | 2/2002 |
| KR | 20090040260 | A | 4/2009 |
| KR | 20110094812 | A | 8/2011 |
| KR | 101146253 | B1 | 5/2012 |
| KR | 101176423 | B1 | 8/2012 |
| KR | 20120087494 | A | 8/2012 |
| KR | 20130070609 | A | 6/2013 |
| KR | 20140037238 | A | 3/2014 |
| KR | 20140092362 | A | 7/2014 |
| KR | 20150016496 | A | 2/2015 |
| KR | 20150080511 | A | 7/2015 |
| KR | 20160041928 | A | 4/2016 |

OTHER PUBLICATIONS

International Search Report including the Written Opinion for Application No. PCT/KR2018/005103 dated Aug. 10, 2018, 12 pages.

* cited by examiner

TWO PART ADHESIVE COMPOSITION

CROSS-REFERENCE TO RELATED APPLICATIONS

The present application is a national phase entry under 35 U.S.C. § 371 of International Application No. PCT/KR2018/005103 filed May 2, 2018, which claims priority from Korean Patent Application No. 10-2017-0056390 filed May 2, 2017, all of which are incorporated herein by reference.

TECHNICAL FIELD

The present disclosure relates to a two-part adhesive composition exhibiting excellent lap shear strength and adhesive strength.

BACKGROUND OF ART

A two-part acrylic adhesive is used in fields such as those of automobiles, buildings, marine, wind power, and the like, because it can be cured at room temperature, adhered to a large area, quickly cured, and adhere to various plastics.

However, the two-part acrylic adhesive has disadvantages in that adhesive strength is lower than that of a one-part epoxy adhesive and elongation is lower than that of a urethane adhesive. As a result, it has been restricted in fields requiring stronger adhesive strength such as structural adhesives for vehicles, and higher elongation such as adhesion outside the vehicle.

In addition, there is a trade-off relationship between flexibility/toughness and strength in various adhesive compositions. In general, in order to increase flexibility and toughness in an adhesive composition, a rubbery polymer is added, but the addition of such rubbery polymer adversely affects the modulus and finally strength of the adhesive. Therefore, it is required to develop an adhesive composition exhibiting excellent adhesive strength without sacrificing strength.

DETAILED DESCRIPTION OF THE INVENTION

Technical Problem

The present disclosure provides a two-part adhesive composition exhibiting excellent lap shear strength and adhesive strength.

Technical Solution

The present disclosure provides a two-part adhesive composition, including: (i) a first part containing the following components (a1) to (a4); and (ii) a second part containing the following components (b1) and (b2), in a weight ratio of 1:1 to 20:1:

(i)
(a1) 100 parts by weight of a (meth)acrylate-based monomer, and based thereon,
(a2) 5 to 70 parts by weight of a styrene-acrylonitrile copolymer,
(a3) 50 to 100 parts by weight of an adhesion enhancer, and
(a4) 1 to 10 parts by weight of a filler;
(ii)
(b1) 100 parts by weight of an epoxy resin, and based thereon,
(b2) 50 to 150 parts by weight of an initiator.

Advantageous Effects

The two-part adhesive composition according to the present disclosure can exhibit high adhesive strength due to excellent lap shear strength by including an adhesion enhancer of a specific component. Further, it can exhibit excellent adhesive properties to metals and plastic substrates. Therefore, it can be used as an adhesive in various fields such as those of automobiles, buildings, marine, wind power, and the like.

DETAILED DESCRIPTION OF THE EMBODIMENTS

The terminology used herein is only for the purpose of describing particular embodiments, and is not intended to be limiting of the invention. Singular forms are intended to include plural forms as well, unless the context clearly indicates otherwise. It will be further understood that the terms "include", "have", and "possess", when used in this specification, specify the presence of stated features, steps, components, or combinations thereof, but do not preclude the presence or addition of one or more other features, steps, components, or combinations thereof.

Also, in this disclosure, when it is mentioned that a layer or element is formed "on" or "above" another layer or element, it means that the layer or element is formed directly on the other layer or element or another layer or element is additionally formed between the layers, on an object, or on a substrate.

As the present invention can be variously modified and have various forms, specific embodiments thereof are shown by way of examples and will be described in detail. However, it is not intended to limit the present invention to the particular disclosed forms, and it should be understood that the present invention includes all modifications, equivalents, and replacements within the idea and technical scope of the present invention.

In this disclosure, (meth)acrylate is used as a concept including both acrylate and methacrylate.

Hereinafter, the two-part adhesive composition according to the exemplary embodiments of the present disclosure will be described in more detail.

The two-part adhesive composition according to an embodiment includes: (i) a first part containing the following components (a1) to (a4); and (ii) a second part containing the following components (b1) and (b2):

(i)
(a1) 100 parts by weight of a (meth)acrylate-based monomer, and based thereon,
(a2) 5 to 70 parts by weight of a styrene-acrylonitrile copolymer,
(a3) 50 to 100 parts by weight of an adhesion enhancer, and
(a4) 1 to 10 parts by weight of a filler;
(ii)
(b1) 100 parts by weight of an epoxy resin, and based thereon,
(b2) 50 to 150 parts by weight of an initiator.

As the adhesive composition includes the styrene-acrylonitrile copolymer (SAN), lap shear strength may be improved, and as a result, high adhesive strength may be exhibited.

In the adhesive composition according to an embodiment of the present disclosure, the effect of the invention can be further improved by controlling the kind or physical properties of each component. The following is a detailed description of each component.

(The First Part)

In the adhesive composition according to an embodiment of the present disclosure, the first part is a main part, and includes (a1) 100 parts by weight of a (meth)acrylate-based monomer, and based thereon, (a2) 5 to 70 parts by weight of a styrene-acrylonitrile copolymer, (a3) 50 to 100 parts by weight of an adhesion enhancer, and (a4) 1 to 10 parts by weight of a filler.

Herein, the (meth)acrylate-based monomer may include an alkyl (meth)acrylate compound and a (meth)acrylate compound containing at least one hydroxyl group in the molecule.

In this disclosure, the alkyl (meth)acrylate includes both an alkyl acrylate-based monomer and an alkyl methacrylate-based monomer. The alkyl group of the alkyl (meth)acrylate may be a linear or branched alkyl group having 1 to 20 carbon atoms. When the number of carbon atoms in the alkyl group is more than 20, the glass transition temperature (Tg) of the adhesive composition may be high or it may be difficult to control the adhesion.

Examples of the alkyl (meth)acrylate may include methyl methacrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate. One or a mixture of two or more of them may be used.

The alkyl group of the alkyl (meth)acrylate may specifically be a linear or branched alkyl group having 1 to 4 carbon atoms, and more specifically a methyl group or an ethyl group, considering the effect of improving the adhesion by controlling the number of carbon atoms of the alkyl group in the alkyl (meth)acrylate.

The alkyl (meth)acrylate may be included in an amount of about 40 to about 70 wt % based on the total weight of the (meth)acrylate-based monomer. When included within the range, the wetting property may be improved with excellent adhesion. When the amount of the alkyl (meth)acrylate is too small, the wetting property between the adhesive and adherend may be deteriorated. When the amount is too large, the adhesive property may be deteriorated. More specifically, the alkyl (meth)acrylate may be included in an amount of about 50 to about 60 wt %, considering the excellent effect of improvement by controlling the amount of the alkyl (meth)acrylate in the adhesive composition.

The (meth)acrylate containing at least one hydroxyl group in the molecule improves the wetting property between the adhesive and adherend, increases the formation of hydrogen bonds with the filler or the alkyl (meth)acrylate, and increases the dispersion of the adhesion enhancer, thereby improving the adhesive property of the adhesive composition.

Examples of the (meth)acrylate containing at least one hydroxyl group in the molecule may include 2-hydroxyethyl (meth)acrylate, 2-hydroxypropyl (meth)acrylate, 4-hydroxybutyl (meth)acrylate, 2-hydroxyethylene glycol (meth)acrylate, or 2-hydroxypropylene glycol (meth)acrylate. One or a mixture of two or more of them may be used. Among them, 2-hydroxyethyl acrylate may be used, considering the improvement of adhesive strength of the adhesive composition and improvement of mechanical properties.

The (meth)acrylate containing at least one hydroxyl group in the molecule may be included in an amount of about 1 to about 10 wt %, preferably about 2 to about 8 wt %, based on the total weight of the (meth)acrylate-based monomer. When the amount is too small, the wetting property between the adhesive and adherend may be deteriorated, and the formation of hydrogen bonds with the filler or the alkyl (meth)acrylate may be reduced. When the amount is too large, the dispersion of the adhesion enhancer may be deteriorated.

In addition, bisphenol A polyethylene glycol diether dimethacrylate, a phosphate ester of PPG methacrylate, or the like may be used to improve adhesive strength, and a urethane acrylate oligomer or the like may be used to improve durability and flexibility of the adherend.

The styrene-acrylonitrile copolymer has higher tensile strength and hardness than other adhesion enhancers such as poly(acrylonitrile-butadiene-styrene) and poly(styrene-butadiene styrene), while being transparent. Therefore, when used in the adhesive composition, high shear strength and high transparency can be imparted to the adherend.

Specifically, it is preferable that the styrene-acrylonitrile copolymer has tensile strength of about 650 to about 800 $kg/cm^2$ (measured in accordance with ASTM D638). Generally, the acrylonitrile-butadiene-styrene copolymer or the like has tensile strength of about 350 to about 500 $kg/cm^2$. Therefore, when the styrene-acrylonitrile copolymer having tensile strength within the range is used in the adhesive composition, the shear strength after adherence may be improved to about 30 to about 220%.

In addition, according to an embodiment of the present disclosure, it is preferable that the styrene-acrylonitrile copolymer has an acrylonitrile content of about 20 to about 35 wt %. When the content of the acrylonitrile component is too small, there may be a problem that chemical resistance deteriorates when used for the adhesive. I addition, when the content of the acrylonitrile component is too large, rigidity of the adherend may be deteriorated.

According to another embodiment of the present disclosure, the styrene-acrylonitrile copolymer may have a weight average molecular weight measured using GPC of about 100,000 to about 320,000 g/mol, or about 110,000 to about 200,000 g/mol. When the weight average molecular weight of the styrene-acrylonitrile copolymer is out of the above range, there is a possibility that chemical resistance and heat resistance of the adhesive may be deteriorated on the adherend.

According to another embodiment of the present disclosure, the styrene-acrylonitrile copolymer may have a melt index value measured in accordance with ASTM D1238 of about 25 to 60 g/10 min, or about 45 to 60 g/10 min, and a softening point measured in accordance with ASTM D1525 of about 95 to 110° C., or about 95 to 105° C. Therefore, it has an excellent melting property, and improves wettability on the adherend when used in the adhesive, thereby helping to impart an excellent adhesive property.

According to another embodiment of the present disclosure, the styrene-acrylonitrile copolymer may have a tensile strength value measured in accordance with ASTM D638 of about 650 to about 800 $kg/cm^2$, or about 670 to about 750 $kg/cm^2$, and may have excellent mechanical properties. The styrene-acrylonitrile copolymer having the tensile strength value within the range can improve the adhesive strength when used for the adhesive. When the value is out of an appropriate range, elongation may be deteriorated.

Further, the styrene-acrylonitrile copolymer may have a flexural strength value measured according to ASTM D790 of about 1100 to about 1350 kg/cm$^2$.

In addition, the styrene-acrylonitrile copolymer has a transparency of about 80 to about 90% and is excellent in optical characteristics. Therefore, it has an advantage that the color can be varied when used in an adhesive composition.

The styrene-acrylonitrile copolymer may be included in an amount of 5 to 70 parts by weight, preferably about 5 to about 50 parts by weight, and more preferably about 5 to 25 parts by weight, based on 100 parts by weight of the (meth)acrylate-based monomer.

When the amount of the styrene-acrylonitrile copolymer is too large, the shear strength of the acrylic adhesive may be increased. However, flexibility may be deteriorated, a cracking phenomenon may easily occur on the adherend, and impact strength may be lowered. In particular, the thixotropic index may be lowered since the styrene-acrylonitrile copolymer has a linear structure.

(The Adhesion Enhancer)

The adhesion enhancer improves the mechanical properties of the adhesive composition, and may include a rubber, a rubber copolymer, a rubber derivative, and the like.

Examples of the adhesion enhancer may include a butadiene-based rubber such as a vinyl terminated butadiene rubber, a chlorinated butadiene rubber, a chlorosulfonated butadiene rubber, a nitrile butadiene rubber (NBR), a styrene butadiene rubber (SBR); a silicone rubber; a rubber copolymer such as a styrene-butadiene-polymethylmethacrylate triblock copolymer, a poly(acrylonitrile-butadiene-styrene), and a poly(styrene-butadiene styrene); and a rubber derivative. One or a mixture of two or more of them may be used.

In addition, the adhesion enhancer may include a core-shell rubber or a non-core shell rubber. The core-shell rubber may be a graft copolymer of a "core-shell" type, or may also be a "shell-less" cross-linked rubbery particle such as acrylonitrile-butadiene styrene (ABS), methacrylate-butadiene-styrene (MBS), and methacrylate-acrylonitrile-butadiene-styrene (MABS).

The vinyl terminated butadiene rubber may be in liquid form at room temperature, and may have a glass transition temperature below 0° C. The vinyl terminated butadiene may have the form of (meth)acrylate-termination, for example, a (meth)acrylate-terminated polybutadiene-acrylonitrile copolymer such as HYCAR VTBN, or a (meth) acrylate-terminated polybutadiene such as HYCAR VTB (Emerald Performance Polymers). The adhesion enhancer may include the vinyl terminated butadiene rubber in an amount of about 20 wt % or less, more preferably about 5 to about 15 wt %, based on the total weight of the adhesion enhancer.

The adhesion enhancer may be included in an amount of 50 to 100 parts by weight, preferably about 50 to about 70 parts by weight, based on 100 parts by weight of the (meth)acrylate-based monomer. When the amount of the adhesion enhancer is too small, the mechanical properties of the adhesive composition may be deteriorated. When the amount of the adhesion enhancer is too large, the adhesiveness with the substrate may be lowered.

(The Filler)

The filler improves the mechanical properties of the adhesive composition together with the adhesion enhancer.

Examples of the filler may include silica, fumed silica, and nano-clay. One or a mixture of two or more of them may be used.

Considering the effect of improving fluidity of the adhesive composition and the effect of improving a small-particle strengthening property, the filler may include a silica-based filler such as silica and fumed silica. Considering the effect of reducing the sinkage of the applied adhesive bead, fumed silica may be included.

The filler may be included in an amount of 1 to 10 parts by weight, preferably about 2 to about 8 parts by weight, based on 100 parts by weight of the (meth)acrylate-based monomer. When the amount of the filler is too small, the mechanical properties may be deteriorated, and when the amount is too large, the adhesive strength and adhesiveness with the substrate may be decreased.

(The Carbon Nanotube)

According to an embodiment of the present disclosure, the first part may further include carbon nanotubes having an aspect ratio of $1\times10^2$ to $1\times10^5$.

The carbon nanotube is a carbon structure in which six carbon atoms are bonded in a hexagonal honeycomb pattern to form a tubular shape. As the carbon nanotube has a very high aspect ratio and has excellent mechanical properties, heat resistance, and chemical resistance, it has been widely used as a filler.

In the adhesive composition according to an embodiment of the present disclosure, the carbon nanotubes can exhibit the effect of a nanocomposite together with the polymer resin used as the adhesion enhancer, and as a result, the mechanical properties, chemical resistance, and heat resistance can be improved.

Specifically, the carbon nanotubes may be single-walled carbon nanotubes, double-walled carbon nanotubes, or multi-walled carbon nanotubes. In addition, it may be a bundle type of carbon nanotubes with a bundle or rope shape in which a plurality of carbon nanotubes are arrayed or entangled with the carbon nanotube as a unit, or a non-bundled EHSMs entangled type of carbon nanotube without a uniform shape such as a bundle or rope shape. One or a mixture of two or more of them may be used. Among them, the carbon nanotubes may be the multi-walled carbon nanotubes, considering the improvement in adhesiveness and heat resistance of the adhesive composition. Further, it may be the bundle type of carbon nanotubes, considering the excellent dispersibility in the adhesive composition.

In addition, the carbon nanotubes may have a large aspect ratio of about 1 to about 50 nm in diameter and several tens of micrometers in length.

Specifically, considering the excellent dispersibility of the carbon nanotubes and the excellent improvement of nanocomposite formation with the adhesion enhancer, the carbon nanotubes may have an aspect ratio (length/diameter ratio) of about $1\times10^2$ to about $1\times10^5$, more specifically, about $5\times10^2$ to about $5\times10^4$.

The carbon nanotubes may have a BET specific surface area of about 150 m$^2$/g or more, or about 200 to about 500 m$^2$/g, and more specifically about 220 to about 300 m$^2$/g. The strand diameter of the carbon nanotubes may be about 2 nm to about 30 nm, or about 5 nm to about 20 nm, and more specifically about 5 nm to about 15 nm. By having such a small specific surface area and a small diameter, compatibility with a polymer substrate and dispersibility in the adhesive composition are excellent.

Meanwhile, the most important factor for ensuring excellent properties in carbon nanotube composites is uniform dispersion of the carbon nanotubes. Even in the case of an adhesive containing carbon nanotubes, when dispersion is excellent, mechanical properties such as strength and elasticity can be remarkably improved. Dispersion can be improved by covalent attachment of chemical species at the sidewalls, ends, or defects of the carbon nanotubes, which are interspersed between the bundles of carbon nanotubes to facilitate the dispersion of the carbon nanotubes in the adhesive composition. In addition, the dispersibility of the carbon nanotubes in the adhesive composition can be increased by surface modification through a non-covalent bond.

Accordingly, it is important to find an optimum condition of modification for improving the adhesive strength, thereby improving the structural properties between the carbon nanotubes and the adhesive.

Generally, the carbon nanotubes are likely to be clustered due to their large surface area. Further, high polarization of a pi electron cloud of the carbon nanotubes generates a strong Van der Waals force between the carbon nanotubes, thereby preventing uniform dispersion. In order to prevent this, the carbon nanotubes may be used in the form of a dispersion solution in which the carbon nanotubes are dispersed in a dispersion medium. Examples of the dispersion medium may include n-vinyl pyrrolidone, butyl acrylate, acrylic acid, a benzoate ester-based oil, and methyl methacrylate. Among them, one or both of the benzoate ester-based oil and methyl methacrylate may be used in consideration of excellent compatibility with the carbon nanotubes and storage stability. Since the dispersion medium for dispersing the carbon nanotubes is a component of the adhesive composition according to the present disclosure, the carbon nanotubes may be used in a way that they may be firstly mixed with the above-mentioned compound and dispersed in the preparation of the adhesive composition, and then the remaining components may be added thereto and mixed.

The carbon nanotubes may be included in an amount of about 0.01 to about 1 wt % based on the total weight of the adhesive composition. When the amount of the carbon nanotubes is too small, the effect of improving adhesive strength by the use of the carbon nanotubes may be insignificant. When the amount is too large, dispersion and adhesiveness with the substrate may be decreased.

In the adhesive composition according to an embodiment of the present disclosure, the second part (ii) includes (b1) 100 parts by weight of an epoxy resin, and based thereon, (b2) 50 to 150 parts by weight of an initiator.

(The Epoxy Resin)

The epoxy resin affects the dielectric constant and dielectric loss coefficient of the adhesive composition and the adhesive film prepared therefrom, and allows them to have improved heat resistance and mechanical properties.

Therefore, the type of the epoxy resin is not particularly limited, but it is preferable to have an epoxy equivalent of 200 g/eq to 500 g/eq to improve the heat resistance of the adhesive composition while lowering the dielectric constant and dielectric loss coefficient.

Examples of the epoxy resin may include a cycloaliphatic epoxide, an epoxy novolac resin, a bisphenol-A epoxy resin, a bisphenol-F epoxy resin, a bisphenol-A epichlorohydrin epoxy resin, an alkyl epoxide, a dicyclopentadiene phenol addition reaction type of epoxy resin, a limonene dioxide, and a polyepoxide. One or a mixture of two or more of them may be used.

When the epoxy resin is blended with the first part, it may be included in an amount of about 1 to about 10 parts by weight, preferably about 2 to about 8 parts by weight, based on 100 parts by weight of the (meth)acrylate-based monomer of the first part. When the amount of the epoxy resin is too small, the effect of improving the heat resistance and mechanical properties may be deteriorated, and when too large, the fluidity of the composition may excessively increase.

(The Initiator)

The initiator is used to initiate a polymerization reaction by providing free radicals. A curing rate and adhesive strength can be expected to improve depending on the combination of the initiator and a curing accelerator.

Examples thereof may include hydrogen peroxide, alkyl peroxide, alkyl hydroperoxide, aryl alkyl peroxide, and a peroxy ester. One or a mixture of two or more of them may be used.

More specifically, the initiator may include diisopropylbenzene hydroperoxide, t-hexylhydroperoxide, 1,1,3,3-tetramethylbutyl hydroperoxide, dicumyl peroxide, t-butyl cumyl peroxide, methyl ethyl ketone peroxide, methyl isobutyl ketone peroxide, cyclohexanone peroxide, cumene hydroperoxide, t-butyl hydroperoxide, benzoyl peroxide, acetyl peroxide, lauroyl peroxide, 1,1-di(t-butylperoxy) cyclohexane, 1,1-di(t-butylperoxy) 3,3,5-trimethyl cyclohexane, hydrogen peroxide, t-butyl peroxybenzoate, t-butyl peroxy 2-ethylhexanoate, bis(4-t-butylcyclohexyl) peroxydicarbonate, and a mixture thereof. Among them, benzoyl peroxide may be included.

When the initiator is blended with the first part, it may be included in an amount of about 0.1 to about 10 parts by weight, preferably about 1 to about 5 parts by weight, based on 100 parts by weight of the (meth)acrylate-based monomer of the first part.

(The Additives)

The adhesive composition according to an embodiment of the present disclosure may further include an additive conventionally known in at least one of the parts (i) and (ii) in addition to the above-mentioned components within a range not hindering the effect of the present disclosure. Specifically, the composition may include at least one additive such as an adhesion promoter, an inhibitor, an accelerator, an antioxidant, a lubricant, an initiator, an oil, a curing agent, and a curing accelerator.

The adhesion promoter is a substance which forms cross-linking for enhancing metallic interaction with a metal surface and for strengthening a polymer network. Specifically, it may be a phosphorous-containing compound such as a mono-ester of phosphonic acid having one unit of vinyl or an allyl-based unsaturated group, and a monoester and a diester of phosphonic acid or phosphoric acid. Specific examples may include phosphoric acid; a (meth)acrylate phosphate such as 2-methacryloyloxyethyl phosphate, bis-(2-methacryloyloxyethyl) phosphate, 2-acryloyloxyethyl phosphate, bis-(2-acryloyloxyethyl) phosphate, methyl-(2-methacryloyloxyethyl) phosphate, ethyl methacryloyloxyethyl phosphate, methyl acryloyloxyethyl phosphate, ethyl acryloyloxyethyl phosphate, propyl acryloyloxyethyl phosphate, isobutyl acryloyloxyethyl phosphate, ethylhexyl acryloylethyl phosphate, halopropyl acryloyloxyethyl phosphate, haloisobutyl acryloyloxyethyl phosphate, haloethylhexyl acryloyloxyethyl phosphate, and the like; vinyl phosphonic acid; cyclohexene-3-phosphonic acid; α-hydroxybutene-2-phosphonic acid; 1-hydroxy-1-phenyl-methane-1,1-diphosphonic acid; 1-hydroxy-1-methyl-1-diphosphonic acid; 1-amino-1-phenyl-1,1-diphosphonic acid; 3-amino-3-hydroxypropane-1,1-diphosphonic acid; aminotris(methylenephosphonic acid); gamma-amino-propylphosphonic acid; gamma-glycidoxypropylphosphonic acid; phosphoric acid-mono-2-aminoethyl ester; allylphosphonic acid; allylphosphinic acid; β-methacryloyloxyethylphosphinic acid; diallylphosphinic acid; β-methacryloyloxyethylphosphinic acid; allylmethacryloyloxyethylphosphinic acid; and the like. One or a mixture of two or more of them may be used.

Examples of the adhesion promoter may include (meth) acrylic acid and a metal (meth)acrylate (zinc adimethacrylate, etc.).

This adhesion promoter may be included in the first part of the adhesive composition and in an amount of about 0.5 to about 10 wt %, more specifically about 1 to about 5 wt %, based on the total weight of the polymer.

The inhibitor is used to stabilize the adhesive composition and to inhibit premature free radical polymerization of alkyl (meth)acrylate to provide a suitable initiation time. Examples of the inhibitor may include naphthoquinone, anthroquinone, methylhydroquinone, benzoquinone, and methyletherhydroquinone. One or a mixture of two or more of them may be used.

This inhibitor may be included in the first part of the adhesive composition and may be included in an amount of about 0.01 to about 1 wt %, more specifically about 0.01 to about 0.5 wt %, based on the total weight of the adhesive composition.

The accelerator acts as a catalyst for accelerating or catalyzing the curing of the adhesive composition, and may include an amine compound.

The amine compound may be a secondary amine (HN(Ra)2, wherein each Ra is independently a C4 to C10 alkyl group), a tertiary amine (N(Rb)3, wherein each Rb is independently a C1 to C20 alkyl group, a C6 to C20 aryl group, a C7 to C20 alkylaryl group, or a C7 to C20 arylalkyl group), an aromatic amine, or a heterocyclic amine. More specifically, examples of the amine compound may include 1,8-diazabicyclo(5.4.0)undec-7-ene (DBU), 1,4-diazabicyclo(2.2.2) octane (DABCO), triethylamine, guanidine-based compounds (tetramethylguanidine (TMG), etc.), toluidine-based compounds (dimethyl-p-toluidine (DMPT), diethyl-p-toluidine (DEPT), dihydroxyethyl p-toluidine, dimethyl-p-toluidine (DMPT), dimethyl-o-toluidine (DMOT), etc.), aniline-based compounds (dimethyl aniline, dihydroxyethyl aniline, etc.), thiourea-based compounds (acyl thiourea, benzoyl-thiourea, aryl-thiourea, etc.) and pyridine-based compounds (dihydrophenyl pyridine, etc.). One or a mixture of two or more of them may be used.

This accelerator may be included in the first part of the adhesive composition and may be included in an amount of about 0.1 to about 5 wt %, more specifically about 1 to about 3 wt %, based on the total weight of the adhesive composition.

In addition, the antioxidant may exhibit an antioxidative effect such as improving thermal stability of the adhesive composition. Phosphorous, phenolic, amine, or sulfur-based antioxidants may be used. Examples of the phosphorous-based antioxidant may include a phosphate such as triphenylphosphate (TPP) and triethyl Phosphate (TEP); a phosphonate such as diethyl(3,5-di-tert-butyl-4-hydroxybenzyl) phosphonate, bis(2,6-di-tert-butyl-4-methylphenyl) pentaerythritol diphosphate, bis(2,4-di-tert-butylphenyl) pentaerythritol diphosphate, bis(2,4-dicumylphenyl) pentaerythritol-diphosphite, and distearyl pentaerythritol diphosphate; phosphinate; phosphine oxide; phosphazene; and a metal salt thereof. One or a mixture of two or more of them may be used.

Examples of the phenolic antioxidant may include hindered phenol-based compounds such as 2,6-di-tert-butyl-p-cresol, tetrakis[methylene-3-(3,5-di-tert-butyl-4-hydroxyphenyl) propionate] methane, thiodiethylene bis[3-(3,5-di-tert-butyl-4-hydroxyphenyl) propionate], and N,N'-hexane-1,6-diyl bis[3-(3,5-di-tert-butyl-hydroxyphenyl propionamide]. One or a mixture of two or more of them may be used.

The antioxidant may be included in the first part of the adhesive composition and may be included in an amount of about 0.1 to about 1 wt %, more specifically about 0.1 to about 0.5 wt %, based on the total weight of the adhesive composition.

In addition, the lubricant is to enhance moldability and provide releasability upon desorption with a substrate. Specifically, waxes such as olefin wax, montan wax, and montanic acid ester wax may be used.

The lubricant may be included in the first part of the adhesive composition. When the lubricant is included in an excessive amount, moldability may be deteriorated. Therefore, it may be included in an amount of about 0.1 to about 1 wt %, more specifically about 0.1 to about 0.5 wt %, based on the total weight of the adhesive composition.

Further, the adhesive composition may include additives such as an oil (a benzoate ester-based oil such as an alkyl benzoate, etc.); a curing agent (ethylene diamine trianhydride, etc.); a curing accelerator (an organometallic salt or an organometallic complex containing at least one metal selected from the group consisting of iron, copper, zinc, cobalt, lead, nickel, manganese and tin such as Cu naphthenate and cobalt naphthenate); and the like.

The first and second parts with the above-described composition may have appropriate viscosity by controlling the kind and content of the components thereof. Specifically, in the adhesive composition according to the present disclosure, the second part may have higher viscosity than the first part.

More specifically, the viscosity of the first part may be about 5000 to about 60,000 cp, and the second part may have higher viscosity than that of the first part, which is in the range of about 50,000 to about 150,000 cp.

The adhesive composition according to the present disclosure can be used by preparing the first and second parts, respectively, by mixing the above-mentioned components, and then mixing the first part and the second part in order to initiate reactive curing. Herein, the first part: the second part may be mixed in a weight ratio of about 1:1 to about 20:1, preferably about 5:1 to about 15:1, and more preferably about 7:1 to about 10:1. When the proportion of the second part is too small, the curing of the adhesive is insufficient, so that adhesive strength, heat resistance, and durability of the adherend may be lowered. When the proportion of the second part is too large, compatibility and solubility between the mixed materials may be deteriorated.

The adhesive composition having the above-mentioned composition exhibits excellent adhesive strength by including the adhesion enhancer of a specific component. Therefore, it can be used as an adhesive, primer, or coating agent for adhesion of various substrates including metals, polymers, reinforced plastics, fibers, glass, ceramics, wood, and the like, and can be used in adhesion of heterogeneous materials such as metals and plastics. Herein, examples of the metals include zinc, copper, cadmium, iron, tin, aluminum, silver, chromium, alloys thereof, and galvanized steel such as hot-dip electroplated galvanized steel and galvannealed steel. Further, the adhesive composition exhibits excellent lap shear strength and can be adhered at room temperature, which is useful in fields requiring large-area adhesion and high elongation of a large-sized vehicle, specifically ceilings and side panels of buses, trailer adhesion of trucks, ceilings of trains, floors, windows, headlight covers, and the like.

Hereinafter, the function and effect of the present invention will be described in more detail through specific examples of the present invention. However, these examples are for illustrative purposes only, and the invention is not intended to be limited by these examples.

EXAMPLE

Examples 1 to 7 and Comparative Examples 1 and 2

A two-part acrylate adhesive was prepared with the compositions shown in Table 1 below.

The styrene-acrylonitrile copolymer used for preparing the adhesive is as follows.

The acrylonitrile content: 25 wt %

The weight average molecular weight: about 130,000 g/mol (measured using GPC)

The melt index value (measured in accordance with ASTM D1238): 55 g/10 min

The softening point (measured in accordance with ASTM D1525): 100° C.

The tensile strength value (measured in accordance with ASTM D638): 680 Kg/cm$^2$ The flexural strength value (measured according to ASTM D790): 1100 Kg/cm$^2$

Comparative Example 3

A two-part adhesive composition was prepared according to Example 1 of U.S. Published Patent Application No. 2015-0376473.

Adhesion Evaluation

Lap shear strength was measured according to the ASTM D 3163 method using the two-part adhesives of the examples and comparative examples, and the results are summarized in the following tables.

The following substrates were used.

CRS (Cold Rolled Steel): Using Dongbu Steel's general cold-rolled/bright steel sheet products CFRP (Carbon Fiber-Reinforced Plastic): Using C&TECH's CFRP products GFRP (Glass Fiber-Reinforced Plastic): Using C&TECH's GFRP products SUS (Stainless Steel): Using POSCO's 304 products Al (aluminum panel): Using Jinding's 1060 products

TABLE 1

| type | Component | Material (unit: g) | Example 1 | Example 2 | Example 3 | Example 4 |
|---|---|---|---|---|---|---|
| The first part | (Meth) acrylate-based monomer | Methyl methacrylate | 50.330 | 50.330 | 50.330 | 50.330 |
| | | 2-hydroxyethyl methacrylate | 5.000 | 5.000 | 5.000 | 5.000 |
| | | Bisphenol A Polyethylene Glycol Diether Dimethacrylate | 2.400 | 2.400 | 2.400 | 2.400 |
| | | Phosphate Esters of PPG Methacrylate | 0.240 | 0.240 | 0.240 | 0.240 |
| | | Acrylated urethane oligomer | | | | 2.000 |
| | Adhesion enhancer | Styrene acrylonitrile copolymer | 7.000 | 7.000 | 7.000 | 7.000 |
| | | Vinyl terminated butadiene rubber | 4.310 | 4.310 | 4.310 | 4.310 |
| | | Chlorosulphonated polyethylene | 5.570 | 5.570 | 5.570 | 5.570 |
| | | Poly (styrene-butadiene-styrene) | 6.500 | 6.500 | 6.500 | 6.500 |
| | | Poly (acrylonitrile-butadiene-styrene) | 12.810 | 12.810 | 12.810 | 12.810 |
| | Adhesion promoter | Methacrylated phosphate | 0.700 | | 0.700 | 0.700 |
| | Adhesion promoter | Methyl acrylic acid | 2.000 | | | |
| | Additive | Methyl Hydroquinone (inhibitor) | | | | |
| | Inhibitor | Methylether Hydroquinone (inhibitor) | 0.020 | 0.020 | 0.020 | 0.020 |
| | Antioxidant | 2,6-di-tert-butyl-p-cresol (antioxidant) | 0.200 | 0.200 | 0.200 | 0.200 |
| | Filler | Fumed silica | 2.000 | 2.000 | 2.000 | 2.000 |
| | | Carbon nanotube | 0.050 | 0.050 | 0.050 | 0.050 |
| | Additive | Wax (lubricant) | 0.300 | 0.300 | 0.300 | 0.300 |
| | | Ethylenediamine trianhydride (etc.) | 0.060 | 0.060 | 0.060 | 0.060 |
| | | Cu naphthenate (etc.) | 0.001 | 0.001 | 0.001 | 0.001 |
| | | Dimethyl-p-toluidine (accelerator) | 1.000 | 1.000 | 1.000 | 1.000 |
| | | Dihydrophenyl pyridine (accelerator) | 1.000 | 1.000 | 1.000 | 1.000 |
| The second part | Epoxy Additive | Epoxy resin | 2.600 | 2.600 | 2.600 | 2.600 |
| | | Polyether benzoate (oil) | 2.600 | 2.600 | 2.600 | 2.600 |

TABLE 1-continued

| type | Component | Material (unit: g) | | | | |
|---|---|---|---|---|---|---|
| | Initiator | Benzoyl peroxide | 2.600 | 2.600 | 2.600 | 2.600 |
| | Adhesion enhancer | Poly(methacrylate-butadiene-styrene) | 2.100 | 2.100 | 2.100 | 2.100 |
| | Additive | Saccharin (etc.) | | | | |
| | CRS/CRS Lap shear strength (MPa) | | 25.000 | 21.100 | 24.800 | 25.200 |

| type | Component | Material (unit: g) | Example 5 | Example 6 | Example 7 |
|---|---|---|---|---|---|
| The first part | (Meth)acrylate-based monomer | Methyl methacrylate | 58.000 | 50.330 | 50.330 |
| | | 2-hydroxyethyl methacrylate | | 5.000 | 5.000 |
| | | Bisphenol A Polyethylene Glycol Diether Dimethacrylate | | 2.400 | 2.400 |
| | | Phosphate Esters of PPG Methacrylate | | 0.240 | 0.240 |
| | | Acrylated urethane oligomer | | | |
| | Adhesion enhancer | Styrene acrylonitrile copolymer | 30.000 | 5.000 | 5.000 |
| | | Vinyl terminated butadiene rubber | 3.000 | 4.310 | 4.310 |
| | | Chlorosulphonated polyethylene | | 5.000 | 5.000 |
| | | Poly (styrene-butadiene-styrene) | | 4.500 | 4.500 |
| | | Poly (acrylonitrile-butadiene-styrene) | | 16.800 | 16.800 |
| | Adhesion promoter | Methacrylated phosphate | 1.000 | 2.000 | 2.000 |
| | Adhesion promoter | Methyl acrylic acid | 3.000 | 2.000 | 2.000 |
| | Additive | Methyl Hydroquinone (inhibitor) | | 0.020 | 0.020 |
| | Inhibitor | Methylether Hydroquinone (inhibitor) | | 0.020 | 0.020 |
| | Antioxidant | 2,6-di-tert-butyl-p-cresol (antioxidant) | | 0.200 | 0.200 |
| | Filler | Fumed silica | 2.000 | 2.000 | 2.000 |
| | Filler | nano-clay | | | |
| | | Carbon nanotube | | 0.050 | 0.050 |
| | Additive | Wax (lubricant) | | 0.300 | 0.300 |
| | | Ethylenediamine trianhydride (etc.) | | 0.060 | 0.060 |
| | | Cu naphthenate (etc.) | | 0.001 | 0.001 |
| | | Dimethyl-p-toluidine (accelerator) | 1.000 | 1.000 | 2.000 |
| | | Dihydrophenyl pyridine (accelerator) | 1.000 | | |
| The second part | Epoxy | Epoxy resin | 2.600 | 2.600 | 2.600 |
| | Additive | Polyether benzoate (oil) | 2.600 | 2.600 | 2.600 |
| | Initiator | Benzoyl peroxide | 2.600 | 2.600 | 2.600 |
| | Adhesion enhancer | Poly(methacrylate-butadiene-styrene) | 2.100 | 2.100 | 2.100 |
| | Additive | Saccharin (etc.) | | 1.000 | 1.000 |
| | CRS/CRS Lap shear strength (MPa) | | 24.600 | 23.900 | 22.700 |

TABLE 2

| Type | Component | Material (unit: g) | Comp. Ex. 1 | Comp. Ex. 2 |
|---|---|---|---|---|
| The first part | (Meth)-acrylate-based monomer | Methyl methacrylate | 55.830 | 57.855 |
| | | 2-hydroxyethyl methacrylate | 2.500 | |
| | | Bisphenol A Polyethylene Glycol Diether Dimethacrylate | 3.200 | |
| | | Phosphate Esters of PPG Methacrylate | 1.000 | |
| | | Acrylated urethane oligomer | | |
| | Adhesion enhancer | Styrene acrylonitrile copolymer | | |

TABLE 2-continued

| Type | Component | Material (unit: g) | Comp. Ex. 1 | Comp. Ex. 2 |
|---|---|---|---|---|
| | | Vinyl terminated butadiene rubber | 5.180 | 8.56 |
| | | Chlorosulphonated polyethylene | | |
| | | Poly (styrene-butadiene-styrene) | | 2.5 |
| | | Poly (acrylonitrile-butadiene-styrene) | *23.930 | 5.56 |
| | Adhesion promoter | Methacrylated phosphate | | 1 |
| | Adhesion promoter | Methyl acrylic acid | | 0.95 |
| | Additive | Methyl Hydroquinone (inhibitor) | | |
| | Inhibitor | Methylether Hydroquinone (inhibitor) | 0.120 | |
| | Antioxidant | 2,6-di-tert-butyl-p-cresol (antioxidant) | 0.120 | |
| | Filler | Fumed silica | 5.000 | 2 |
| | Filler | Nano-clay | 3.000 | |
| | | Carbon nanotube | 0.100 | 0.05 |
| | Additive | Wax (lubricant) | | 0.4 |
| | | Ethylenediamine trianhydride (etc.) | | |
| | | Cu naphthenate (etc.) | | |
| | | Dimethyl-p-toluidine (accelerator) | 1.000 | 1 |
| | | Dihydrophenyl pyridine (accelerator) | | |
| The second part | Epoxy resin | Epoxy resin | 2.600 | 2.600 |
| | Additive | Polyether benzoate (oil) | 2.600 | 2.600 |
| | Initiator | Benzoyl peroxide | 2.700 | 2.700 |
| | Adhesion enhancer | Poly(methacrylate-butadiene-styrene) | 2.100 | 2.100 |
| | Additive | Saccharin(etc.) | | |
| | CRS/CRS Lap shear strength (MPa) | | 16.5 | 20.1 |

*In Comparative Example 1, a styrene-butadiene-polymethylmethacrylate terpolymer was added instead of poly(acrylonitrile-butadiene-styrene).

TABLE 3

| The substrate Lap shear strength (MPa) | Example 1 | Example 2 | Example 3 | Example 4 | Example 5 |
|---|---|---|---|---|---|
| CRS/CRS | 25.0 | 21.1 | 24.8 | 25.2 | 24.6 |
| CRS/CFRP | 13.9 | 12.0 | 13.7 | 14.5 | 13.8 |
| CRS/GFRP | 19.7 | 15.2 | 16.6 | 19.4 | 18.8 |
| SUS/CFRP | 18.4 | 15.0 | 16.8 | 19.0 | 18.1 |
| SUS/GFRP | 19.1 | 16.5 | 18.1 | 19.2 | 18.3 |
| Al/CFRP | 13.4 | 11.0 | 12.5 | 13.5 | 13.9 |
| Al/GFRP | 13.8 | 11.6 | 12.8 | 13.6 | 13.5 |

| The substrate Lap shear strength (MPa) | Example 6 | Example 7 | Comp. Ex. 2 | Comp. Ex. 3 | — |
|---|---|---|---|---|---|
| CRS/CRS | 23.9 | 22.7 | 22.3 | 20.7 | |
| CRS/CFRP | 13.5 | 12.1 | 10.2 | 15.2 | |
| CRS/GFRP | 17.1 | 16.9 | 13.4 | 11.8 | |
| SUS/CFRP | 17.2 | 16.5 | 10.4 | 12.4 | |
| SUS/GFRP | 17.0 | 15.6 | 12.3 | 15.7 | |
| Al/CFRP | 12.2 | 11.2 | 10.0 | 4.3 | |
| Al/GFRP | 12.5 | 11.7 | 11.5 | 3.3 | |

Referring to the above tables, it was confirmed that the two-part adhesive compositions according to the present embodiments have good adhesive strength.

Particularly, in the case of the two-part adhesives according to the examples, excellent adhesive strength can be achieved at the time of homogeneous bonding with CRS, which is a metallic material. In addition, at the time of heterogeneous bonding with the different kinds of metals and plastics, it is possible to achieve excellent adhesive strength as compared with the comparative examples.

The invention claimed is:

1. A two-part adhesive composition, comprising: (i) a first part containing the following components (a1) to (a4); and (ii) a second part containing the following components (b1) and (b2):
   (i)
   (a1) 100 parts by weight of a (meth)acrylate-based monomer, and based thereon,
   (a2) 5 to 70 parts by weight of a styrene-acrylonitrile copolymer;
   (a3) 50 to 100 parts by weight of an adhesion enhancer; and
   (a4) 1 to 10 parts by weight of a filler,
   (ii)
   (b1) 100 parts by weight of an epoxy resin, and based thereon,
   (b2) 50 to 150 parts by weight of an initiator,
   wherein the styrene-acrylonitrile copolymer has a melt index value measured in accordance with ASTM D1238 of 25 to 60 g/10 min, and
   wherein the first part and the second part are included in a weight ratio of 1:1 to 20:1.

2. The two-part adhesive composition of claim 1, wherein the (meth)acrylate-based monomer comprises an alkyl (meth)acrylate compound and a (meth)acrylate compound containing at least one hydroxyl group in the molecule.

3. The two-part adhesive composition of claim 2, wherein the alkyl (meth)acrylate is selected from the group consisting of methyl methacrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

4. The two-part adhesive composition of claim 2, wherein the (meth)acrylate compound containing at least one hydroxyl group in the molecule is selected from the group consisting of 2-hydroxyethyl (meth)acrylate, 2-hydroxypropyl (meth)acrylate, 4-hydroxybutyl (meth)acrylate, 2-hydroxyethylene glycol (meth)acrylate, and 2-hydroxypropylene glycol (meth)acrylate.

5. The two-part adhesive composition of claim 2, wherein the alkyl (meth)acrylate compound is present in an amount of about 40 to about 70 wt % based on the total weight of the (meth)acrylate-based monomer, and the (meth)acrylate compound containing at least one hydroxyl group in the molecule is present in an amount of about 1 to about 10 wt % based on the total weight of the (meth)acrylate-based monomer.

6. The two-part adhesive composition of claim 1, wherein the adhesion enhancer comprises at least one selected from the group consisting of a vinyl terminated butadiene rubber, a chlorinated butadiene rubber, a chlorosulfonated butadiene rubber, a nitrile butadiene rubber, a styrene butadiene rubber, a silicone rubber, a styrene-butadiene-polymethylmethacrylate triblock copolymer, a poly(acrylonitrile-butadiene-styrene), and a poly(styrene-butadiene styrene).

7. The two-part adhesive composition of claim 1, wherein the styrene-acrylonitrile copolymer has a tensile strength value measured in accordance with ASTM D638 of 650 to 800 kg/cm$^2$.

8. The two-part adhesive composition of claim 1, wherein the filler comprises one or a mixture of two or more selected from the group consisting of silica, fumed silica, and nano-clay.

9. The two-part adhesive composition of claim 1, wherein the first part further comprises carbon nanotubes having an aspect ratio of $1\times10^2$ to $1\times10^5$.

10. The two-part adhesive composition of claim 9, wherein the nanotube is present in an amount of about 0.01 to about 1 wt % based on the total weight of the adhesive composition.

11. The two-part adhesive composition of claim 1, wherein the epoxy resin may be at least one selected from the group consisting of a cycloaliphatic epoxide, an epoxy novolac resin, a bisphenol-A epoxy resin, a bisphenol-F epoxy resin, a bisphenol-A epichlorohydrin epoxy resin, an alkyl epoxide, a dicyclopentadiene phenol addition reaction type of epoxy resin, a limonene dioxide, and a polyepoxide.

12. The two-part adhesive composition of claim 1, wherein the initiator comprises at least one selected from the group consisting of hydrogen peroxide, alkyl peroxide, alkyl hydroperoxide, aryl alkyl peroxide, and peroxy ester.

13. The two-part adhesive composition of claim 1, further comprising at least one additive selected from the group consisting of an adhesion promoter, an inhibitor, an accelerator, an antioxidant, a lubricant, an initiator, an oil, a curing agent, and a curing accelerator.

14. The two-part adhesive composition of claim 1, wherein the styrene-acrylonitrile copolymer has an acrylonitrile content of 20 to 35 wt %.

15. The two-part adhesive composition of claim 1, wherein the styrene-acrylonitrile copolymer has a weight average molecular weight of 100,000 to 320,000 g/mol.

16. The two-part adhesive composition of claim 1, wherein the styrene-acrylonitrile copolymer has a softening point measured in accordance with ASTM D1525 of 95 to 110° C.

17. The two-part adhesive composition of claim 1, wherein the styrene-acrylonitrile copolymer has a flexural strength value measured according to ASTM D790 of 1100 to 1350 kg/cm$^2$.

18. The two-part adhesive composition of claim 1, wherein the styrene-acrylonitrile copolymer is poly(acrylonitrile-butadiene-styrene) or poly(styrene-butadiene styrene).

19. The two-part adhesive composition of claim 1, wherein the epoxy resin is present in an amount of about 1 to about 10 parts by weight based on 100 parts by weight of the (meth)acrylate-based monomer of the first part, and the initiator is present in an amount of about 0.1 to about 10 parts by weight based on 100 parts by weight of the (meth)acrylate-based monomer of the first part.

* * * * *